May 9, 1967 L. H. CUTLER 3,318,565
PILOT CONTROLLED VALVE
Filed Jan. 27, 1964 2 Sheets-Sheet 1
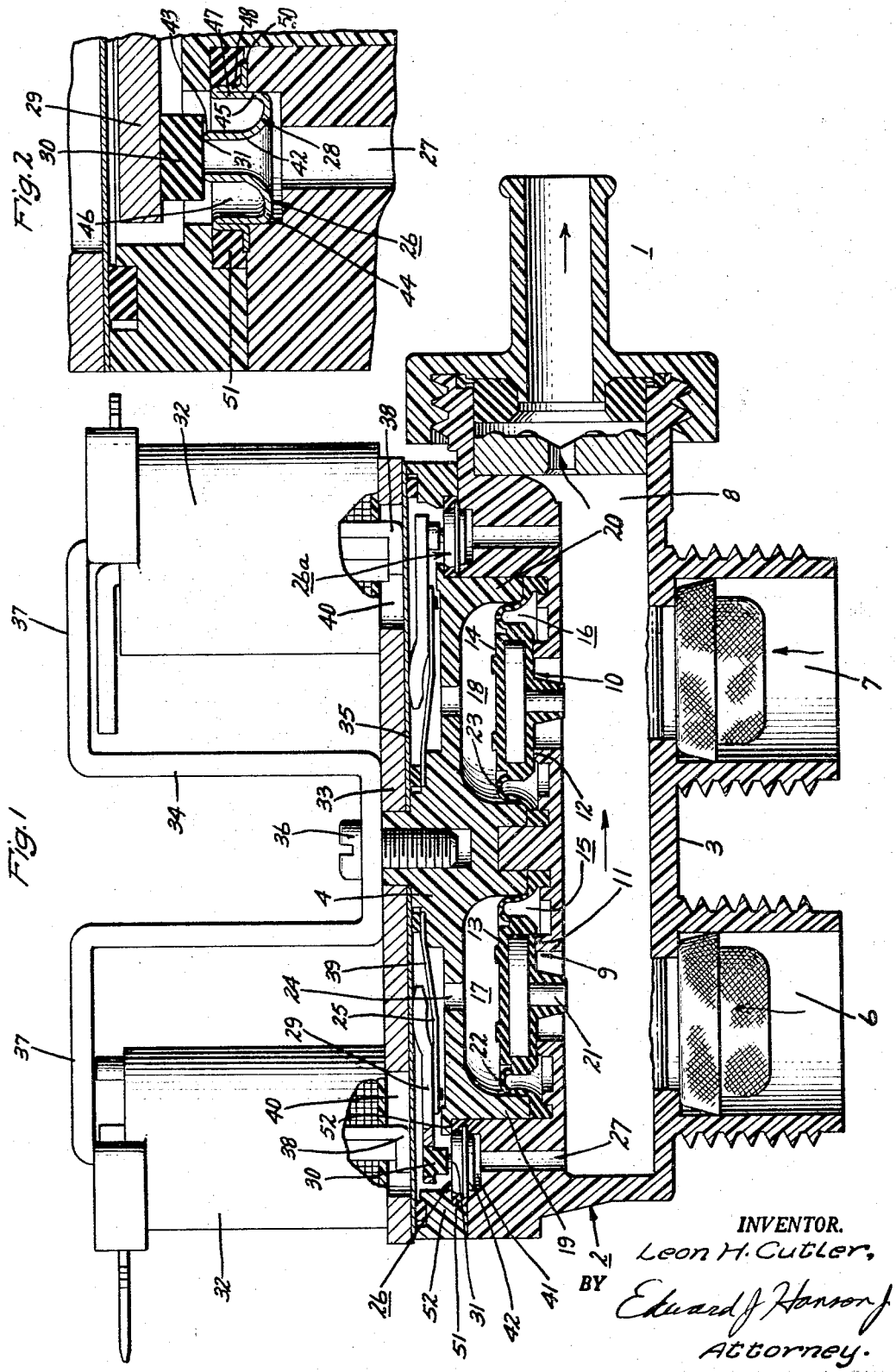
INVENTOR.
Leon H. Cutler,
BY Edward J Hanson
Attorney.

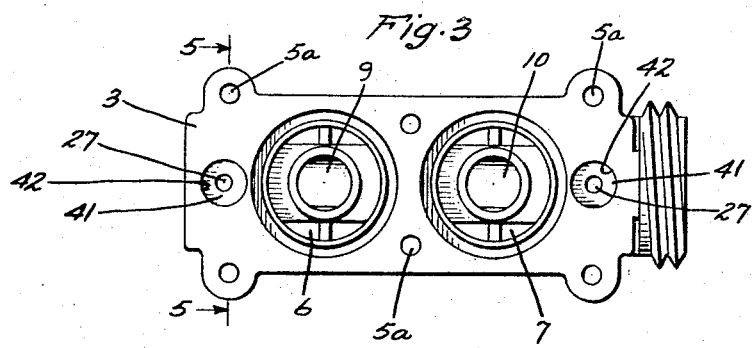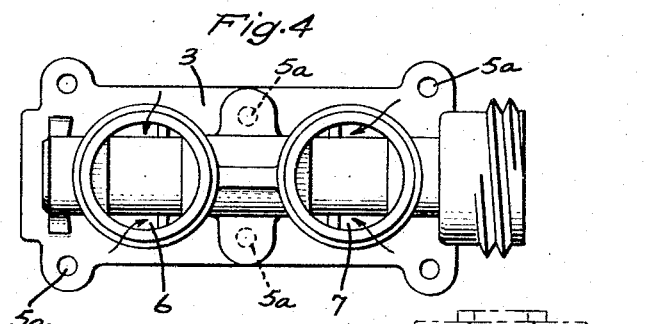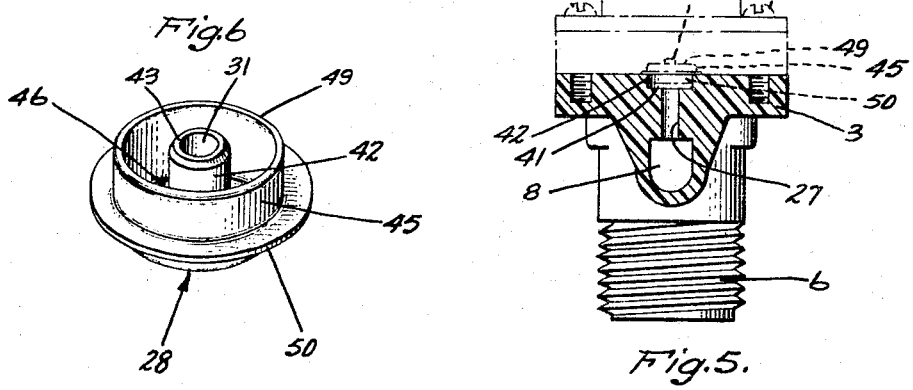

United States Patent Office 3,318,565
Patented May 9, 1967

3,318,565
PILOT CONTROLLED VALVE
Leon H. Cutler, New Haven, Conn., assignor to General
Electric Company, a corporation of New York
Filed Jan. 27, 1964, Ser. No. 340,213
4 Claims. (Cl. 251—45)

My invention relates to pilot controlled, pressure operated valves for use with domestic appliances and more particularly to a new and improved pilot arrangement for use in such valves.

Domestic appliances such as automatic clothes washers customarily include a solenoid actuated valve for controlling the filling of the machine with water. The valves are ordinarily of the mixing valve type and they are arranged so that they will deliver either hot or cold water, or a mixture of both to the machine as selected by the housewife. Pilot controlled, pressure operated diaphragm valves have found wide use for this service, with one of their major advantages being that they require only a small actuating force from the solenoids to provide the valving action. Since each solenoid controls a pilot system, which in turn controls the valving diaphragm, the solenoids may be much smaller and less expensive than if they were to operate the main valve members directly.

In an improved pilot controlled valve disclosed in my copending application S.N. 162,092, filed Dec. 26, 1961, now Pat. No. 3,140,727, and assigned to the assignee of the present invention, I have provided a pilot control system in which the pilot valves are located remotely from the diaphragms. In this valve a chamber is located over each diaphragm and a bleed aperture is provided for introducing fluid into the chamber from an inlet for closing the diaphragm onto the valve seat. A control passageway is formed in the valve body for releasing the fluid from the chamber to allow the diaphragm to open. This passageway leads from the chamber to the outlet and when it is open, the pressure behind the diaphragm is relieved so that the pressure in the inlet forces the diaphragm open. My present invention is directed to a new and improved pilot valve structure for opening and closing the control passageway.

It is a principal object of my invention to provide a new and improved pilot valve which is so formed that it reliably provides complete closure with minimum closing forces being required.

Another object of my invention is to provide a pilot valve structure which will produce such reliable closure over a long period of time without failure or necessity of repair or cleaning.

A further object is to provide a new and improved port for pilot control valves which is so constructed that it lends itself to economical manufacture in forms of relatively high precision.

In carrying out my invention in one form thereof, I provide a pilot controlled, diaphragm valve having a plastic body or housing comprised of a base housing member and a cover member. The valve has an inlet, an outlet, and the main diaphragm valve for controlling the flow from the inlet to the outlet. A chamber is formed in the valve body over the diaphragm, and a bleed aperture is provided for introducing fluid into the chamber from the inlet for closing the diaphragm onto the valve seat. To allow the diaphragm to open, a control passageway is formed in the valve body for releasing the fluid from the chamber. This passageway leads from the chamber and through a discharge duct to the outlet, and when it is open, the pressure behind the diaphragm is relieved so that the pressure in the inlet forces the diaphragm open.

By my invention a new and improved pilot valve controls the release of the fluid through the control passageway. This pilot valve includes an eyelet port, and a clapper with a pad which fits over the port. The eyelet port is made of a sheet of material formed to define a restricted mouth and a conical barrel. The barrel forms a portion of the control passageway and the clapper opens and closes the control passageway by opening and closing the mouth of the barrel. The barrel terminates in an upwardly turned skirt which forms an annular rim around the barrel. This rim is spaced from the barrel and with it defines an annular groove for catching foreign particles carried by the fluid passing into the barrel. A flange is formed on the outer side of the rim. The flange is firmly engaged on a pilot valve seat formed in the plastic base member. A gasket is positioned around the rim and engaged upon the flange. The housing cover member is engaged over the base member trapping the eyelet port in position in the housing. The gasket is engaged by the cover and compressed to secure the pilot port in position and form a good fluid seal.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

FIG. 1 is a cross-sectional view of a pilot controlled valve incorporating my new and improved pilot arrangement;

FIG. 2 is an enlarged cross-sectional view of one embodiment of the improved pilot valve arrangement;

FIG. 3 is a top view of one part of the two part valve body included in the valve;

FIG. 4 is a bottom view of same body part shown in FIG. 3;

FIG. 5 is a cross-sectional view taken on the line 5—5 of FIG. 3; and

FIG. 6 is an isometric view of the eyelet port employed in the pilot valve arrangement.

Referring now to FIGS. 1–5 of the drawings, I have shown therein a valve 1 which is particularly adapted for use as an inlet and mixing valve in a clothes washing machine. The valve 1 is of the pilot controlled, pressure actuated type and it embodies my invention in one form thereof. The main body or housing 2 of the valve is comprised of a pair of molded plastic housing parts 3 and 4. These molded parts may be formed of any suitable material and by way of example I have found that they may be advantageously formed of plastic material such as the polyamides (nylon). The base housing member 3 and the cover housing member 4 are arranged in a closely fitting relationship and they are held together by any suitable means such as the screws 5 shown in FIG. 5. These screws are positioned in aligned apertures 5a which are formed in the body parts.

The valve 1 includes a pair of laterally spaced inlets 6 and 7 which extend generally parallel to each other. These inlets are formed in the lower or base housing part 3 and also included in that part is a longitudinally extending outlet passageway 8. The inlets 6 and 7 pass upwardly on either side of the outlet passageway 8 in order to provide for the flow of liquid from the inlets into the outlet passageway 8. A pair of main valves 9 and 10 are provided between the inlets and the outlet passageway. These main valves, as shown in FIG. 1, include valve seats 11 and 12 and diaphragms 13 and 14 which cooperate with the valve seats 11 and 12 respectively. The inlet passageways 6 and 7 extend upwardly to the spaces around the valve seats and below the diaphragms, indicated at 15 and 16 and when the diaphragms 13 and 14 are lifted off the valve seats, flow may pass freely from the inlets 6 and 7 into the outlet 8. On the other hand when both of the diaphragms are seated on their respective valve seat, the communication between the inlets and the outlet passageway is sealed off so that no flow can pass through the valve from either inlet.

The diaphrgams 13 and 14 are pressure operated and are controlled by means of an improved pilot system. In the pilot system the operating pressures for closing the diaphragms are provided by the chambers 17 and 18 which are formed in the valve body over the diaphragm. Specifically the chambers 17 and 18 are formed by recesses molded in the cover housing member 4 with depending circular rims 19 and 20 being provided on the housing member 4 to define the lower portions of the recesses, looking at FIG. 1. It will be noted that the diaphragms 13 and 14 are held between the body parts 3 and 4 at the lower end of the chambers 17 and 18, and specifically the outer edges of the diaphragms are secured between circular rims 19 and 20 and the adjacent surfaces on the housing part 3 so as to provide a seal between the body parts. No other sealing means are required between the body parts so far as the main flow passages through the valves are concerned. Suitable metal inserts 21 may be provided in the diaphragms for strengthening purposes.

In order to provide a pressure in the chambers 17 and 18 for closing the diaphragms onto the valve seats, each of the diaphragms is provided with one or more suitable bleeder openings such as the openings 22 and 23. These bleeder openings 22 and 23 lead respectively from the spaces 15 and 16 at the upper ends of the inlet passageways into the chambers 17 and 18 and thereby are effective to introduce liquid at substantially the inlet pressure into the chambers 17 and 18. It will be noted that the areas of the diaphragm exposed respectively to the chambers 17 and 18 are greater than the areas exposed to the inlet spaces 15 and 16 and thereby assuming the liquid cannot escape from the chambers 17 and 18, a greater force is applied on the upper side of the diaphragms than on the lower side of the diaphragms (as shown in FIG. 1). Thereby, the liquid, or more exactly, the pressure in the chambers 17 and 18 is effective to close the diaphragms onto the valve seats 11 and 12 and prevent flow through the main valves.

In order to open the diaphragms 13 and 14 a passageway for each of the chambers 17 and 18 leads through the valve housing parts 3 and 4 to the outlet passageway 8. These passageways, although restricted in size, are capable of passing a greater flow than the bleeder openings 22 and 23 in the diaphragms. Thus, if either of the passageways is opened, it will pass liquid from the chamber 17 or 18 faster than liquid can enter through the bleeder 22 or 23. And thereby the diaphragm closing pressure in the chamber 17 or the chamber 18 is quickly reduced to a point where the opening pressure in the space 15 or the space 16 becomes strong enough to force the associated diaphragm off the valve seat 11 or 12 and open one of the main valves. It will be understood, of course, that the control passageways may be opened separately to control either diaphragm or both passageways may be opened at once to release both diaphragms from their seats.

Taking first the relief passageway from the chamber 17, beginning at the chamber the passageway first extends through an opening 24 which connects the chamber to a cavity or recess 25 formed in the upper face of the housing cover member 4. (See FIG. 1.) From the cavity 25 the passageway extends through the pilot valve 26 and then through the outlet duct 27 which is formed in the housing member 3. It will be found from FIG. 1 that the relief passageway for chamber 18 is similar but reversed in position within the valve. It includes a pilot valve 26a which is identical to the valve 26, and the following discussion of the valve 26 will apply to the valve 26a.

By my invention, the new and improved pilot control valve 26, as seen in FIG. 2, has a port 28 comprising an eyelet port member which is opened and closed by the movement of a clapper 29 having a pad closing member 30. The pad 30 is moved into and out of engagement with the mouth 31 of the pilot port 28. An identical but reversely disposed clapper 29 is provided for the valve 26a.

Looking at FIG. 1 again, it will be seen that actuating solenoids 32 for the pilot valve clappers are positioned over a main mounting plate 33 of the valve. The solenoids are secured on this mounting plate by means of a double yoke structure 34. The mounting plate 33 is itself attached to the valve body in my preferred embodiment by the same screws 5 which secure the body parts 3 and 4 together. A non-magnetic cover plate 35 lies between the mounting plate 33 and the valve body, and it is held on the body by the mounting plate. The yoke structure 34 for the solenoids is secured on the plate by means of a screw 36 threaded into the valve body and it includes two U-shaped legs 37 which hold respective coils 32 in position.

The magnetic flux produced by a solenoid 32 when it is energized passes through the solenoid's center leg 38 to the clapper 29 which functions as an armature. The flux then passes from the clapper to the mounting plate 33 which is magnetic and then returns to the solenoid through its yoke leg which serves as a flux return path. It will be noted that the end of the armature clapper 29 which is held by the spring 39 is slightly offset from the valving end so that the mounting end is in close proximity or even touches the underside of the cover plate 35. Thus a minimum air gap is provided between the armature or clapper 29 and the mounting plate 33 so as to reduce the gap in the return path as far as possible.

The two apertures 40 provide for a close coupling between the solenoids and the clappers in that they allow the magnetic center legs 38 of the solenoids to extend down to the cover plate 35 which is non-magnetic. By reason of the clapper-like operation, resulting from their elonagted configuration and their mounting by means of leaf springs, only a minimum travel is required for the clappers to open the pilot ports. Thus only a relatively small amount of energy is required for the solenoids to operate the armature clappers and, therefore minimum size solenoids can be used. In addition, the magnetic circuit itself is arranged so as to have minimum non-magnetic gaps thereby also enhancing the efficiency of the magnetic system. Further there is no problem of sticking of the valve elements since there are no sliding surfaces involved between the valve elements and the stationary parts.

Referring again to FIG. 1 the clappers 29 are seen to be located in their respective cavities 25. Each clapper has its pad 30 engaged over the mouth 31 of an associated eyelet port 26. The other end of the clapper is supported in a cantilever fashion by means of a leaf spring 39. The leaf spring is supported by the valve part 4, specifically being held between it and the cover member 35 at its end remote from the clapper, and the spring normally biases the clapper into closing engagement on the mouth 31. Thus the outlet ducts 27 leading from the chambers 25 are normally closed, and as a result of this sufficient pressure is built up in the chambers 25 to keep the diaphragms 13 and 14 normally closed on the valve seats 11 and 12. The clappers are respectively attracted by the flux of their respective solenoids 32 when an individual solenoid is energized and thus the energization of either of the solenoids causes its respective armature clapper to lift off the mouth of the associated pilot port opening an outlet duct. This, of course, allows the chamber 25 to drain and thereby the respective diaphragm is opened to allow flow to pass from the inlet to the outlet.

Referring now to FIG. 3 it can be seen that the body part 3 of the housing includes a counter bore 41 at the entrance to the exhaust passageway or outlet duct 27. This counter bore 41 together with the surface of the base member 3 just adjacent it forms the pilot valve seat 42 on which the eyelet port 28 is received. Referring now to FIGS. 2 and 6 it can be seen that the mouth 31 of the eyelet port is disposed above the seat 41 and opens into a central barrel portion 42 leading to the outlet duct 27. The mouth 31 has a beveled or otherwise reduced upper edge 43 against which the clapper pad engages. The barrel forms a flaring conical passageway between the mouth and outlet duct and the bottom edge of the barrel, as seen in FIG. 2, turns upwardly in a skirt 44 forming a surrounding rim 45. The skirt 44 together with the outside wall of the barrel 42 forms a groove or chamber 46 which serves to catch sand and other extraneous materials carried in the liquid passing into the pilot valve. The flow rate in the pilot system is relatively low and this would tend to permit sand and other foreign particles to collect on the pilot valve and interfere with the valve's operation. Thus the groove greatly enhances the reliability of the pilot valve by preventing foreign particles from collecting at critical points. The collection of sand or other materials might clog the valve, preventing secure seating of the buffer or in other ways interfere with the pilot valve operation.

At its upper edge the rim 45 is folded outwardly and downwardly. Thus the rim 45 has an inner wall 47 and an outer wall 48 (FIG. 2). In the illustrated embodiment the outer wall 48 lies directly back against the inner wall 47 but it could be spaced therefrom in an alternate form. The lower edge of the outer wall 48 is turned outwardly and forms an annular flange 50. A gasket 51 is positioned around the rim 45 and upon the flange 50 and it engages the surface of the body part 3 adjacent to the edges of the flange (FIG. 2). The cover housing member 4 has shoulders 52 which firmly engage the top and sides of the gasket thereby securing the pilot port in position and forming a good fluid seal.

Preferably I make my gaskets of rubber but, of course, other materials can be used. It has been found to be preferable to have the rubber gaskets contained on all four sides by the walls of the eyelet port and housing members as shown in FIG. 2. Otherwise the rubber will tend to bulge out where it is not contained and this will likely be accentuated with age for it has been found that the rubber will tend to swell with age when exposed to the fluid in the control passageway. The containment of the gaskets is sufficiently complete in my valve to substantially prevent this outward creeping of the gasket. The close engagement of the shoulders 52 and the upper edge of rim 45 with the minimum clearance necessary for tolerance control may be seen in FIGS. 1 and 2.

The pad 30 carried by the clapper 29 is preferably made of a resilient material and by way of example I have found that it may be advantakeously formed of rubber. When the clapper 29 closes bringing the pad 30 into engagement with the reduced edge of the pilot port 28, as shown in FIG. 2, a biting engagement is achieved. This biting engagement is not in the nature of a piercing of the rubber but more in the nature of a depressing or indentation of the rubber by the reduced edge of the mouth. This action tends to bring about a piercing of any slimy coating which may have formed upon the rubber pad and provides a good seal between the pad and the port.

The eyelet port is preferably formed of a sheet of stainless steel. I have found it desirable to produce the eyelet port through a series of drawing steps. This produces an eyelet port of good precision at an economical cost. Because my valve is adapted for use with appliances using hot water, it is desirable to form the pilot port from a material that resists decomposition due to heat and the action of the fluid passing through the port. I have found stainless steel very satisfactory for this purpose. Stainless steel resists decomposition and the erosion by fluids passing over it. It does not become brittle and therefore a port made of stainless steel will not be cracked by the constant closing action of the clapper.

In addition to the features just mentioned steel is sufficiently strong to enable the eyelet port's walls to be so thin that the desired features of a small central barrel, a sand trapping groove of sufficient size to be effective and a flange for seating the port and positioning a gasket, can be supplied in a miniature eyelet port strong and durable enough to provide the necessary long valve life. My eyelet port permits me to make my control passageway channels of a larger size than the port itself, and then regulate the rate of flow through the control passageway when the valve is open by proper sizing of the circumference of the mouth of the eyelet port. In my eyelet port this dimension can be easily controlled with a high degree of precision at an economical cost. The groove 46 of the eyelet port, by spacing the mouth of the eyelet port from the rim, aids in assuring that the pad is engaged only on the reduced edges of the mouth and not partly on the rim. The pad is, of course, appropriately dimensioned so that it engages only the mouth of the eyelet port and not the surrounding rim. In certain embodiments I form a second counter bore in the housing part 3 larger than the first counter bore 41 so that the flange 50 may be recessed with its upper surface being flush with the general plane of the upper surface of the base housing member 3.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a pilot controlled valve including a valve body a main pressure responsive valve including a diaphragm for controlling the flow through said pilot controlled valve, an inlet leading to said main pressure responsive valve and an outlet leading from said main pressure responsive valve, a pilot system formed in said valve body for controlling the fluid pressure applied to said main valve, said pilot system including a chamber formed in said valve body over said diaphragm, a bleeder opening in the diaphragm for introducing fluid into said chamber from said inlet at substantially the inlet pressure for closing said diaphragm, and a relief passageway in said valve body leading from said chamber to said outlet for releasing fluid from said chamber to allow said diaphragm to open; a control means for said pilot system comprising a pilot valve in said relief passageway, said pilot valve including a metal eyelet port mounted in a seat in said valve body, and a closure member positioned over said port, said eyelet port having a central barrel forming a flow passage therethrough and said closure member engaging the mouth of said barrel to close said pilot port, said barrel terminating in an integral upwardly turned skirt forming an annular rim around said barrel, and a flange extending outwardly from said annular rim, said flange being adjacent said seat in said valve body, a gasket engaging said annular rim, said flange and said valve body for effecting a fluid seal therebetween, and said rim being spaced from said barrel and therewith forming an annular groove for catching foreign particles carried by the fluid passing into said barrel.

2. The valve structure of claim 1 wherein said closure member includes a clapper having a pad operable to open and close the entrance of said barrel, said barrel having a reduced edge at said entrance for engagement with said pad to securely close said port.

3. In a pilot controlled valve including a valve body formed of plastic material, a main pressure responsive valve for controlling the flow through said pilot controlled valve, and a pilot system formed in said valve body for controlling the fluid pressure applied to said main valve; a control means for said pilot system comprising a pilot valve including an eyelet port made of a sheet of metal formed into a restricted mouth and a conical barrel, said sheet turning outwardly at the flared end of said barrel and then upwardly to form an upstanding wall having an axis corresponding to the axis of the barrel, said wall being spaced from the barrel and therewith defining an annular groove therebetween, said sheet then turning outwardly and downwardly to form a second wall, and said sheet terminating in an annular flange extending outwardly from the axis of the passageway, a pilot valve seat formed in said plastic valve body, said flange of said eyelet port firmly engaged on said seat, a gasket disposed around said second wall and engaged on said flange, said plastic body engaging said gasket and clamping said eyelet port on said base, and said gasket being generally surrounded on all sides by the walls of said body and said eyelet port, said clamping engagement forming a secure liquid seal around said eyelet port, and a clapper having a pad operable to open and close the mouth of said barrel, said mouth having a reduced edge for engagement with said pad to securely seal said port.

4. In a pilot controlled valve, a housing having a base housing member and a cover housing member, a main valve seat formed in said valve housing, an inlet leading to said valve seat, and an outlet leading from said valve seat, a diaphragm supported by said housing for engaging said valve seat to shut off the flow between said inlet and said outlet, a chamber formed in said housing over said diaphragm, a bleed opening connecting said inlet to said chamber, and a control passageway in said base housing member leading from said chamber and through an outlet duct to said outlet for releasing fluid from said chamber to allow said diaphragm to open, the improvement comprising a pilot valve in said control passageway, said pilot valve including an eyelet port having a central barrel forming a portion of said control passageway, said barrel having a restricted mouth and terminating in an upwardly turned skirt forming an outer rim around said barrel, said rim being spaced from said barrel and therewith forming a groove for catching foreign particles carried by the fluid passing into said barrel, an outwardly extending flange connected to said rim, said rim being engaged on a seat formed in said base housing member with said flange of said eyelet port being engaged on said seat, and a gasket positioned around said rim and engaged on said flange, said housing cover member being engaged on said base member and engaging said gasket and thereby clamping said eyelet port against said base, said clamping engagement forming a liquid seal around said eyelet port, and a clapper having a pad operable to open and close the restricted mouth of said barrel.

References Cited by the Examiner

UNITED STATES PATENTS

| | | | |
|---|---|---|---|
| 2,661,753 | 12/1953 | Stroop | 251—361 |
| 2,686,034 | 8/1954 | Rabal | 251—46 |
| 2,726,843 | 12/1955 | Evans et al. | 251—359 X |
| 2,844,352 | 7/1958 | Dahl | 251—359 X |
| 2,922,616 | 1/1960 | Budde | 251—368 X |
| 2,956,770 | 10/1960 | Galley | 251—30 |
| 2,962,035 | 11/1960 | Wright et al. | 251—363 X |
| 2,994,505 | 8/1961 | Brakebill | 251—44 X |
| 3,022,039 | 2/1962 | Cone et al. | 251—46 |
| 3,059,894 | 10/1962 | Knecht et al. | 251—361 X |

FOREIGN PATENTS

| | | |
|---|---|---|
| 85,728 | 3/1896 | Germany. |
| 156,309 | 6/1939 | Germany. |
| 227,834 | 4/1960 | Australia. |
| 776,266 | 6/1957 | Great Britain. |

M. CARY NELSON, *Primary Examiner.*

S. SCOTT, *Assistant Examiner.*